(12) United States Patent
Qadri et al.

(10) Patent No.: US 10,292,411 B2
(45) Date of Patent: May 21, 2019

(54) ALUMINUM NITRIDE SYNTHESIS FROM NUT SHELLS

(71) Applicant: The United States of America, as represented by the Secretary of the Navy, Washington, DC (US)

(72) Inventors: Syed B. Qadri, Fairfax Station, VA (US); Bhakta B. Rath, Oakton, VA (US); Edward P. Gorzkowski, III, Odenton, MD (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 15/786,180

(22) Filed: Oct. 17, 2017

(65) Prior Publication Data

US 2018/0134560 A1     May 17, 2018

Related U.S. Application Data

(60) Provisional application No. 62/422,793, filed on Nov. 16, 2016.

(51) Int. Cl.
| | |
|---|---|
| *A23L 25/00* | (2016.01) |
| *B02C 17/20* | (2006.01) |
| *B22F 1/00* | (2006.01) |
| *B22F 3/10* | (2006.01) |
| *B22F 9/04* | (2006.01) |

(Continued)

(52) U.S. Cl.
CPC .............. *A23L 25/00* (2016.08); *B02C 17/20* (2013.01); *B22F 1/00* (2013.01); *B22F 3/10* (2013.01); *B22F 9/04* (2013.01); *B22F 9/30* (2013.01); *B82Y 30/00* (2013.01); *C01B 21/0726* (2013.01); *C01P 2002/72* (2013.01); *C01P 2002/82* (2013.01); *C01P 2004/04* (2013.01)

(58) Field of Classification Search
None
See application file for complete search history.

(56) References Cited

PUBLICATIONS

Amarasinghe et al.; Nanoparticles of Wurtzite Aluminum Nitride from the Nut Shells; AIP Advances; 6, 115204; published online Nov. 1, 2016.*

* cited by examiner

*Primary Examiner* — Guinever S Gregorio
(74) *Attorney, Agent, or Firm* — US Naval Research Laboratory; Stephen T. Hunnius

(57) ABSTRACT

A method of making Aluminum Nitride (AlN) from nut shells comprising preparing powders of agricultural nuts, preparing powders of nanocrystalline $Al_2O_3$, mixing the powders and thereby forming a homogenous sample powder of agricultural nuts and $Al_2O_3$, pressurizing the homogenous sample powder into a disk, heat treating or pyrolyzing the disk in a nitrogen atmosphere, reacting the disk and the nitrogen atmosphere and forming AlN, and wherein the AlN is nano-structured AlN and in a pure form and in the wurtzite phase of AlN. A method of producing Aluminum Nitride comprising milling nuts into a powder, milling a powder of nanocrystalline $Al_2O_3$, mixing, pressing into a pellet, providing nitrogen, heating, and forming AlN. An Aluminum Nitride product from preparing powders of nuts and $Al_2O_3$, mixing, and forming a powder, pressurizing into a disk, pyrolyzing in nitrogen, and forming AlN.

8 Claims, 10 Drawing Sheets

(51) Int. Cl.
*B22F 9/30* (2006.01)
*B82Y 30/00* (2011.01)
*C01B 21/072* (2006.01)

FIG. 2A
(a) Almond
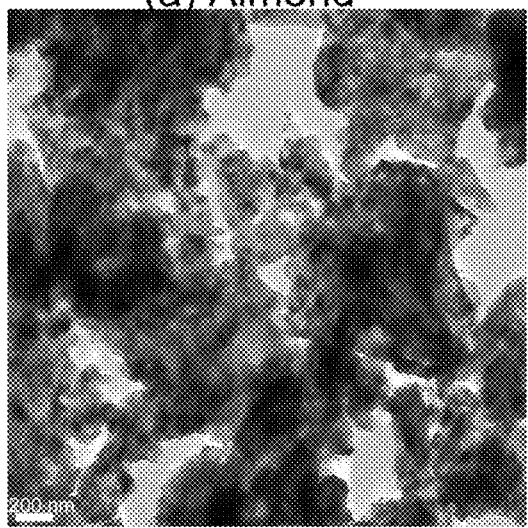
(b) Almond
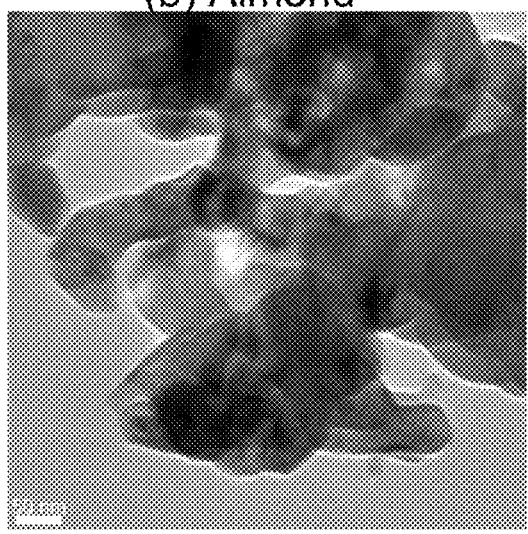
FIG. 2B
FIG. 2C
(c) Walnut
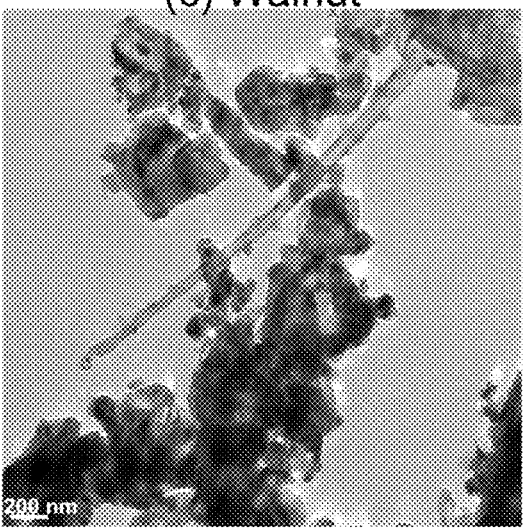
(d) Walnut
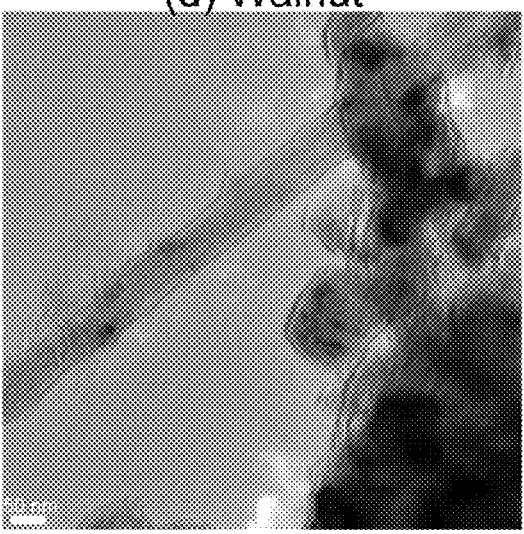
FIG. 2D

ALUMINUM NITRIDE SYNTHESIS FROM NUT SHELLS

REFERENCE TO RELATED APPLICATION

This application is a non-provisional of, and claims priority to and the benefits of, U.S. Patent Application No. 62/422,793 filed on Nov. 16, 2016, the entirety of which is hereby incorporated by reference.

BACKGROUND

This invention concerns a new method for the formation of abundant quantities of Aluminum Nitride (AlN) from a thermal treatment of a mixture of aluminum oxide ($Al_2O_3$) and shells of almond, cashew, coconuts, pistachio, and walnuts in a nitrogen atmosphere at temperatures in excess of 1450° C.

This new method of synthesizing Aluminum Nitride from various Nut Shells uses conventional heating or microwave heating to produce nano-structures.

Billions of pounds of agricultural waste of nut shells such as those of almonds, pistachios, walnuts, cashew, coconuts, macadamia etc. are generated every year all over the world.

Aluminum Nitride (AlN) is a very useful material for industrial and electronic applications due to its unique physical properties.

AlN is an insulator in electronic device applications because of high electrical resistivity, low thermal expansion, resistance to erosion and corrosion, excellent thermal shock resistance and chemical stability in air up to 1380° C. with surface oxidation occurring at 780° C.

Surface acoustic wave sensors (SAWs) can be deposited on silicon wafers because of AlN's piezoelectric properties and AlN can be used as an RF filter for mobile phones.

AlN is synthesized in the bulk form by the carbothermal reduction of aluminum oxide in the presence of gaseous nitrogen or ammonia or by direct nitridation of aluminum. In order to get a fully dense form, $Y_2O_3$ or CaO are required as additives during the hot pressing.

Aluminum nitride is a wide gap semiconductor with band gap between 6.01-6.05 eV at room temperature. It crystallizes in wurtzite phase and has many potential applications in microelectronics due to its relatively high thermal conductivity (70-210 $W·m^{-1}·K^{-1}$ to 285 $W·m^{-1}·K^{-1}$). In addition, other unique properties that make it an attractive for applications include high electrical resistivity, low thermal expansion, resistance to erosion and corrosion, excellent thermal shock resistance and chemical stability in air up to 1380° C. with surface oxidation occurring at 780° C.

Epitaxially grown thin film crystalline aluminum nitride is used for surface acoustic wave sensors (SAWs) deposited on silicon wafers because of AlN's piezoelectric properties. Another important application for AlN is its application as an RF filter which is widely used in mobile phones, which is also called a thin film bulk acoustic resonator (FBAR). AlN is synthesized in the bulk form by the carbothermal reduction of aluminum oxide in the presence of gaseous nitrogen or ammonia or by direct nitridation of aluminum. In order to get fully dense form, $Y_2O_3$ or CaO are required as additives during the hot pressing.

Among the agriculture waste products, there are two types, one containing silica and carbonaceous matter and the other one contains mostly carbonaceous matter and no silica. The first kind includes rice husk, wheat husk, and peanut shells. We have demonstrated that they can be utilized to produce industrially important materials such as $SiO_2$, SiC, $Si_3N_4$, and zinc silicate by pyrolyzing them in air, argon or in nitrogen atmospheres.

The second kind of agriculture residues are nut shells which contain only carbonaceous matter such as almond, walnuts, pistachio, coconuts, macadamia, cashew, etc. Billions of pounds of nut shells are produced annually all over the world and will be available if they can be harnessed in the synthesis of industrially important materials. Recently, it was reported that mixed phases of SiC and $Si_3N_4$ can be produced by carbothermal reduction and nitridation of a mixture of silica and macadamia powder.

We have demonstrated in our recent work that by adding ZnO to powder of wheat or rice husk, pure zinc silicate can be produced with photo-luminescent properties.

Here, we have developed the formation of AlN from the nut shells powder by adding nanocrystalline powders of $Al_2O_3$ to the nut shells powder of almond, walnut, coconut, macadamia, pistachio and cashew and pyrolising them in nitrogen atmosphere at 1400 to 1500° C.

Energy dispersive X-ray fluorescence technique was used to determine the elemental composition of the nuts with very slight variation among them. The formation of pure wurtzite phase of AlN was confirmed by x-ray diffraction and Rietveld analysis and Raman spectroscopy. Transmission electron microscopy was used to confirm the nanocrystallinity of AlN and to characterize the size distribution.

SUMMARY OF DISCLOSURE

Description

A new method of making Aluminum Nitride from Nut Shells involving the formation of abundant quantities of AlN from a thermal treatment of a mixture of aluminum oxide ($Al_2O_3$) and shells of almond, cashew, coconuts, pistachio, and walnuts in a nitrogen atmosphere at temperatures in excess of 1450° C.

DESCRIPTION OF THE DRAWINGS

The following description and drawings set forth certain illustrative implementations of the disclosure in detail, which are indicative of several exemplary ways in which the various principles of the disclosure may be carried out. The illustrated examples, however, are not exhaustive of the many possible embodiments of the disclosure. Other objects, advantages and novel features of the disclosure will be set forth in the following detailed description when considered in conjunction with the drawings.

FIG. 2A illustrates a TEM micrograph of AlN samples fabricated from almond showing the nanocrystalline nature.

FIG. 2B illustrates a TEM micrograph of AlN samples fabricated from almond showing the nanocrystalline nature.

FIG. 2C illustrates a TEM micrograph of AlN samples fabricated from walnut showing the nanocrystalline nature.

FIG. 2D illustrates a TEM micrograph of AlN samples fabricated from walnut showing the nanocrystalline nature.

DETAILED DESCRIPTION OF THE INVENTION

Figure 1:
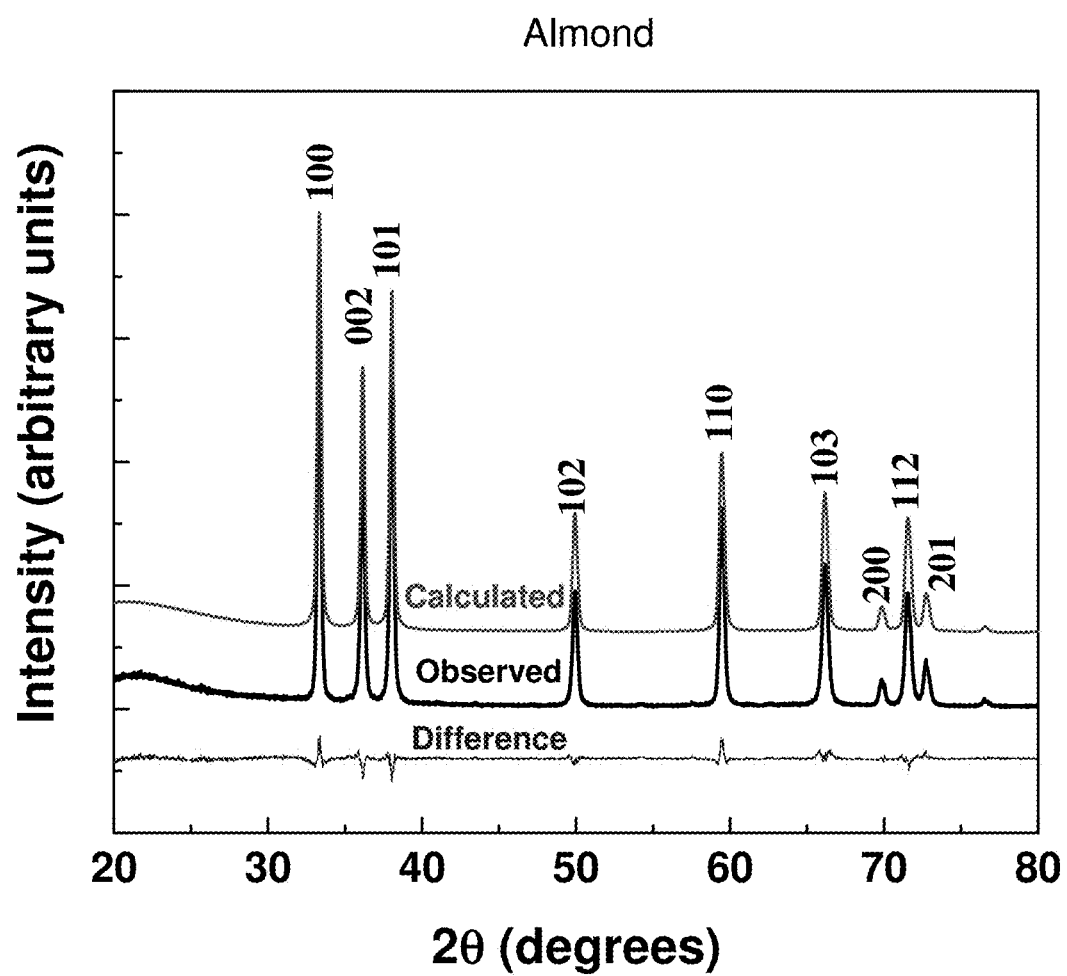
FIG. 1 illustrates X-ray diffraction patterns taken with CuKα radiation of AlN synthesized from Almond powder and aluminum oxide powder in nitrogen at a temperature of 1450° C. showing the wurtzite phase.
Figure 3:
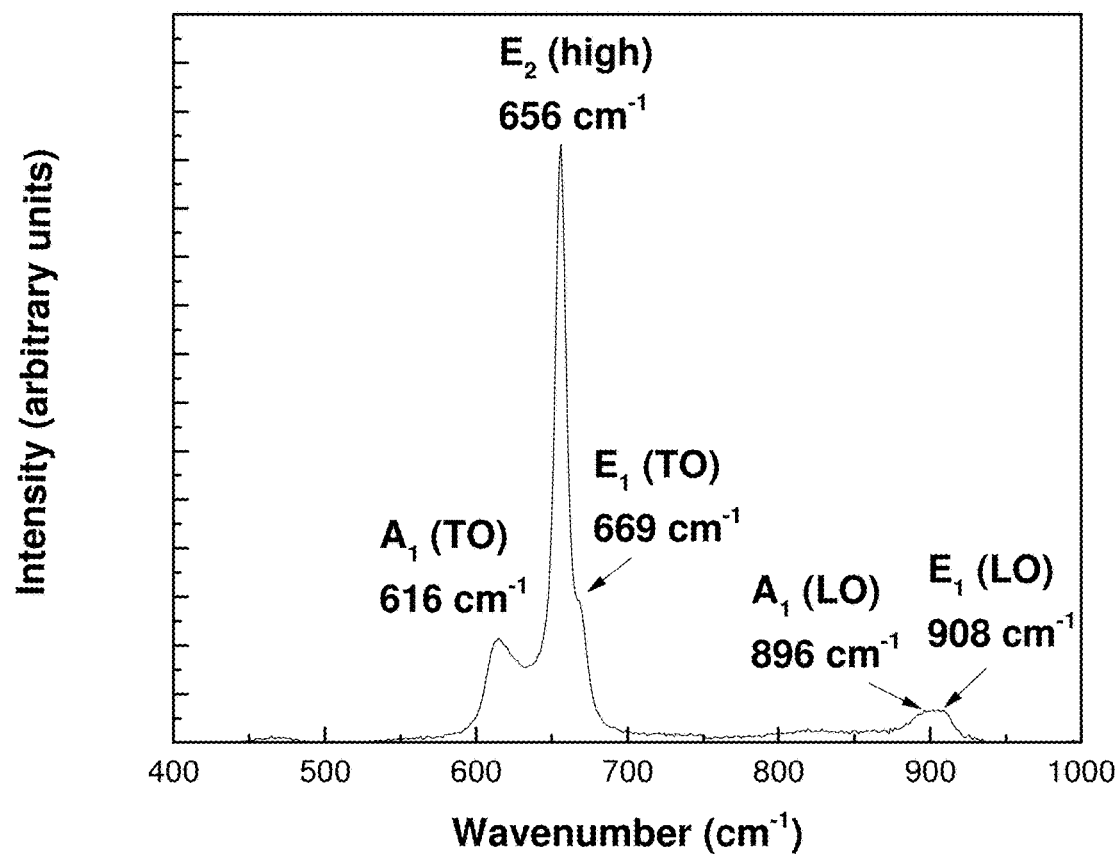
FIG. 3 illustrates Raman Spectra of the AlN sample derived from almond confirming the wurtzite phase.
Figure 4A:
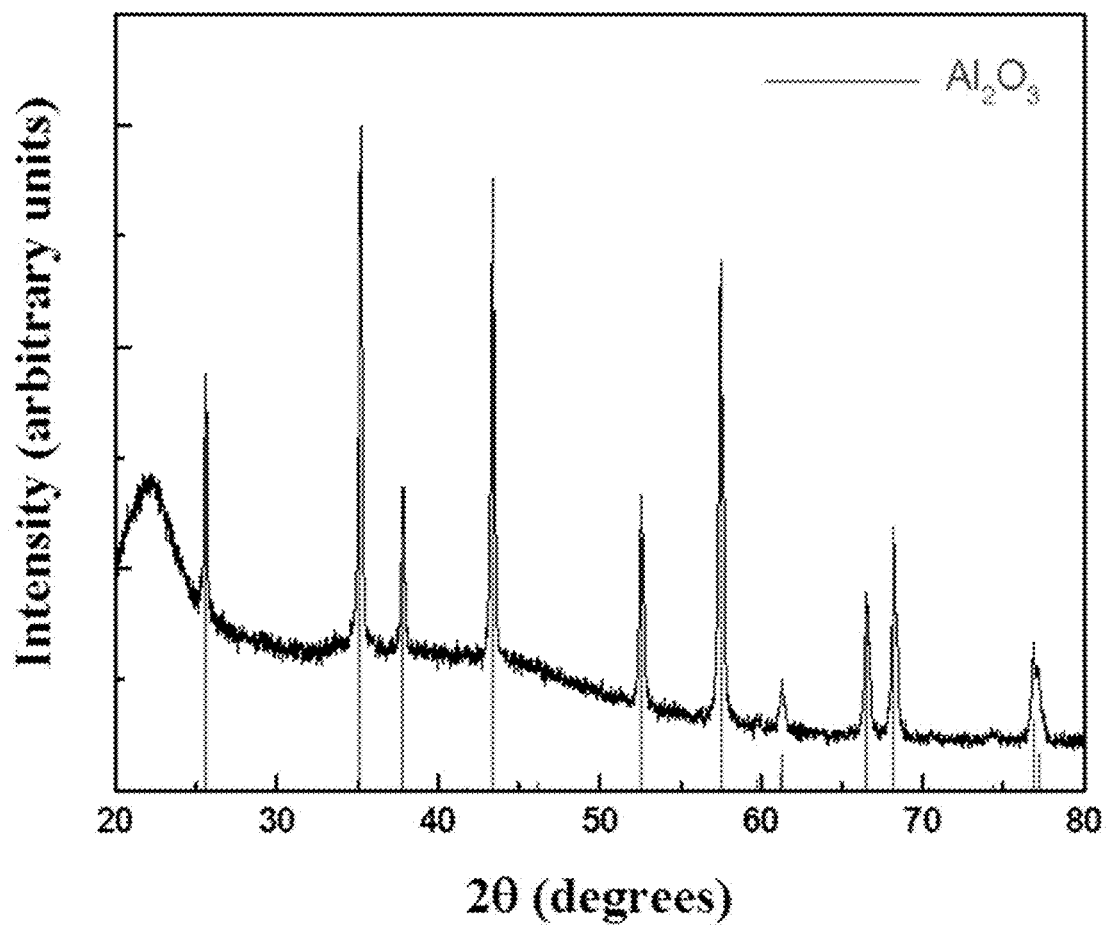
FIG. 4A illustrates X-ray diffraction scan of $Al_2O_3$ mixed with almond showing peaks corresponding to corundum phase. The vertical lines correspond to the expected peaks of alumina.
Figure 4B:
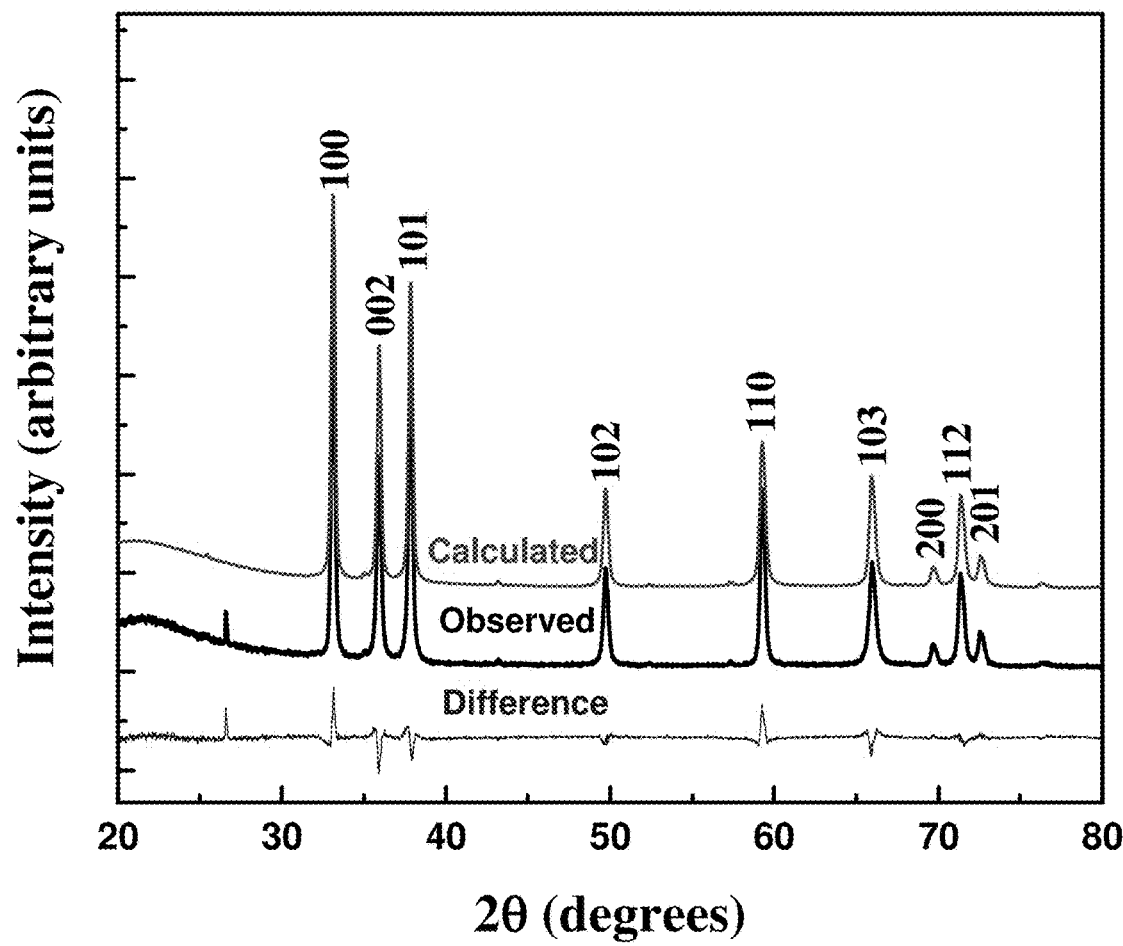
FIG. 4B illustrates a Rietveld whole profile analysis of the diffraction pattern for the AlN sample derived from almond after pyrolising in a nitrogen atmosphere followed by treatment in air at 800° C.
Figure 5A:
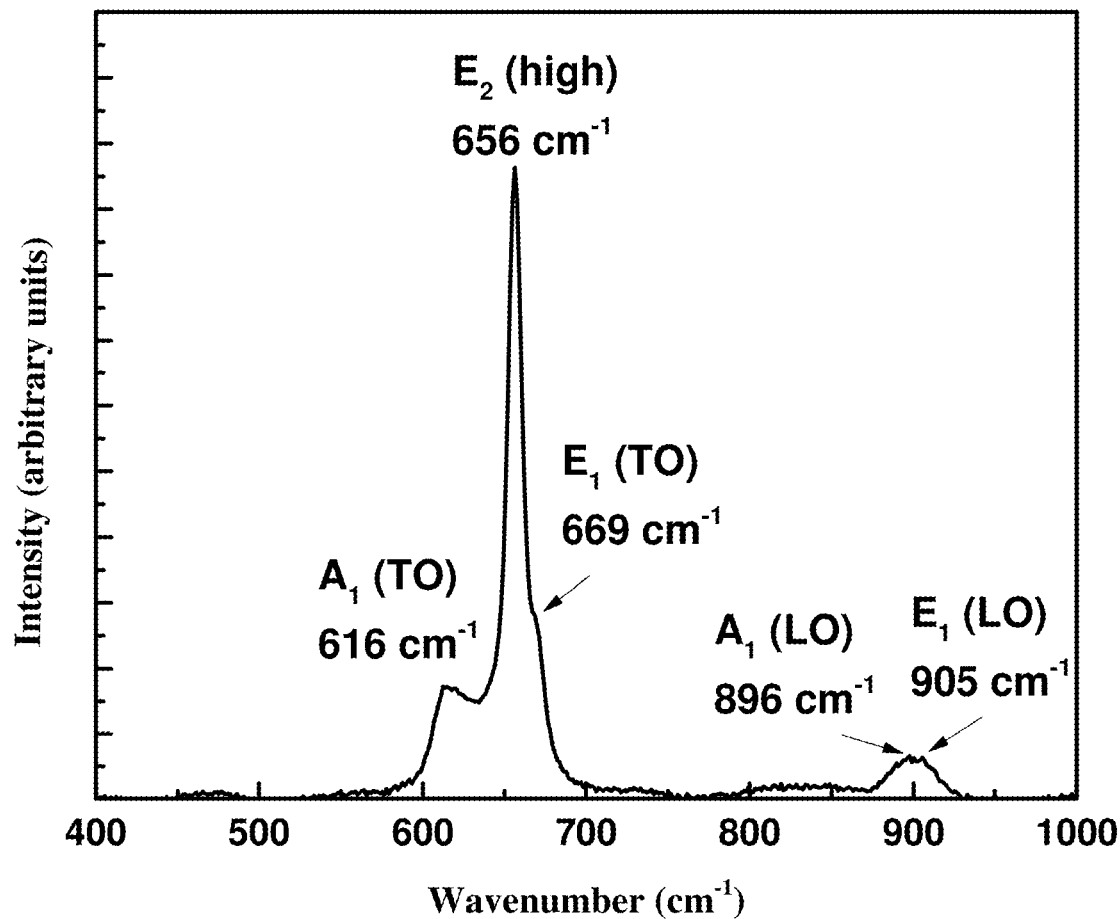
FIG. 5A illustrates Raman spectra of AlN derived from pistachio showing the different Raman active modes.
Figure 5B:
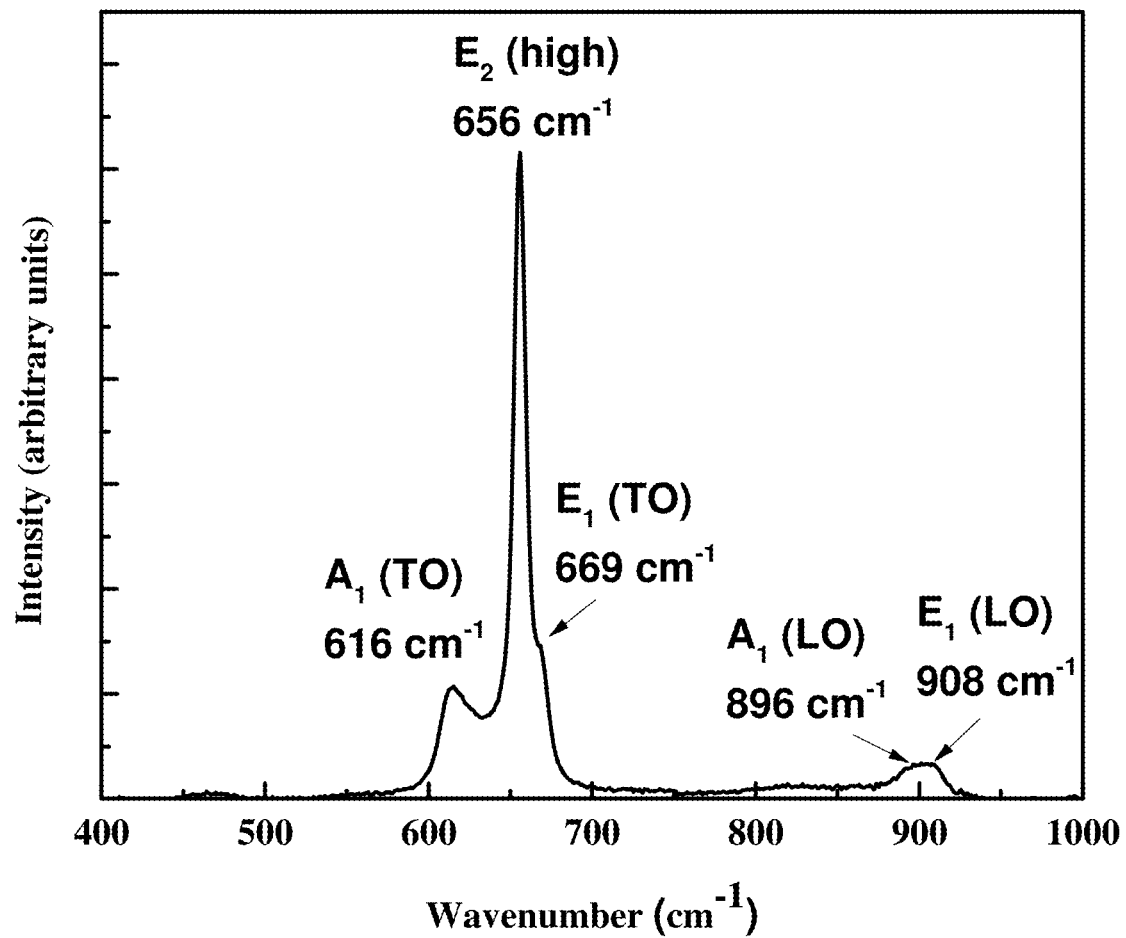
FIG. 5B illustrates Raman spectra of AlN derived from almond showing the different Raman active modes.
Figure 5C:
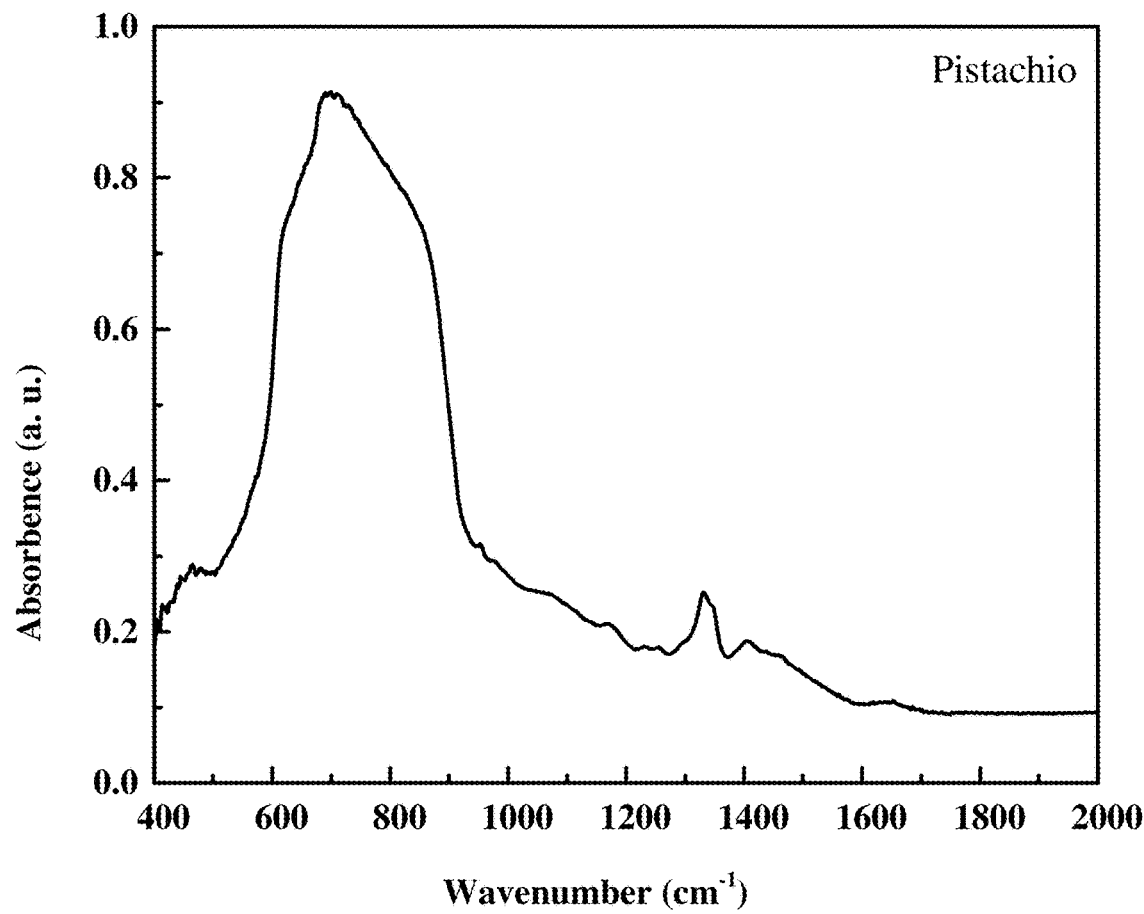
FIG. 5C illustrates FTIR spectra of AlN derived from pistachio showing a broad band of 699 cm$^{-1}$.
Figure 5D:
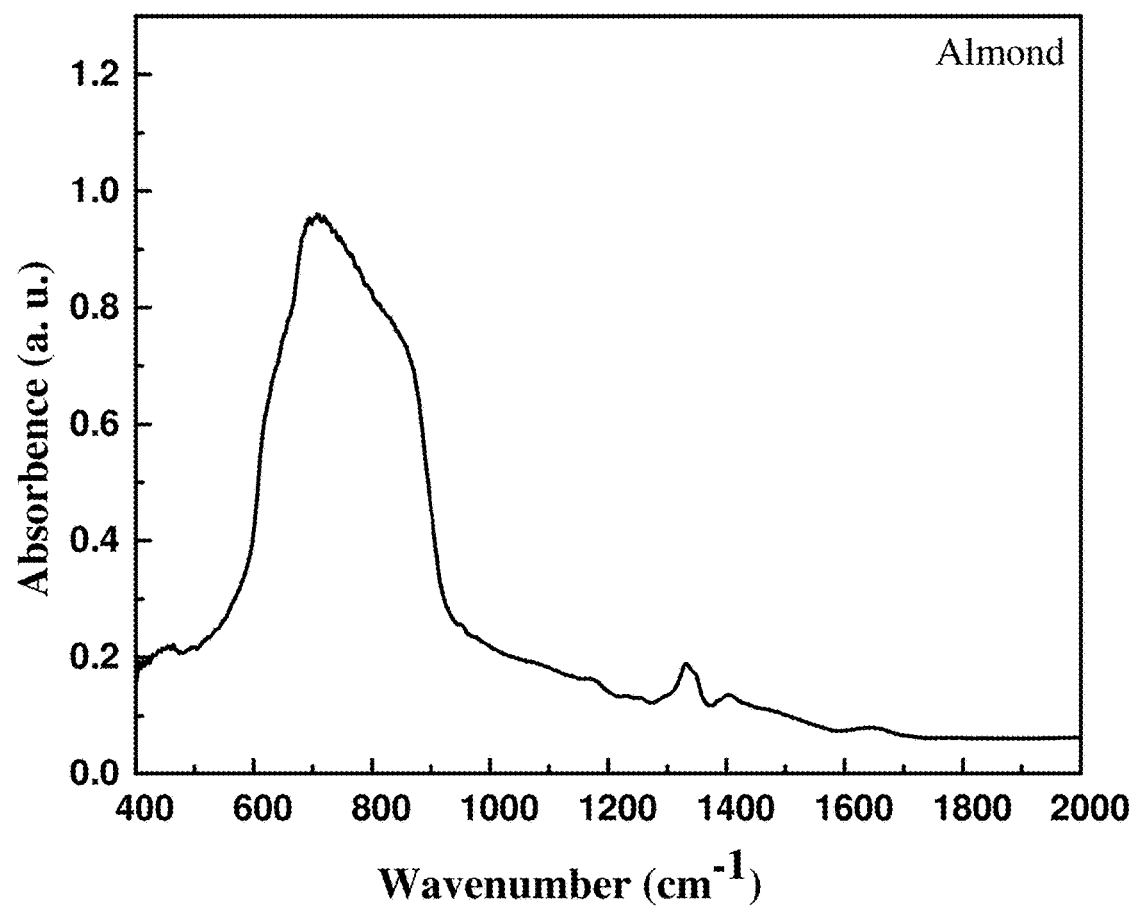
FIG. 5D illustrates FTIR spectra of AlN derived from almond showing a broad band of 698 cm$^{-1}$.
Figure 6:
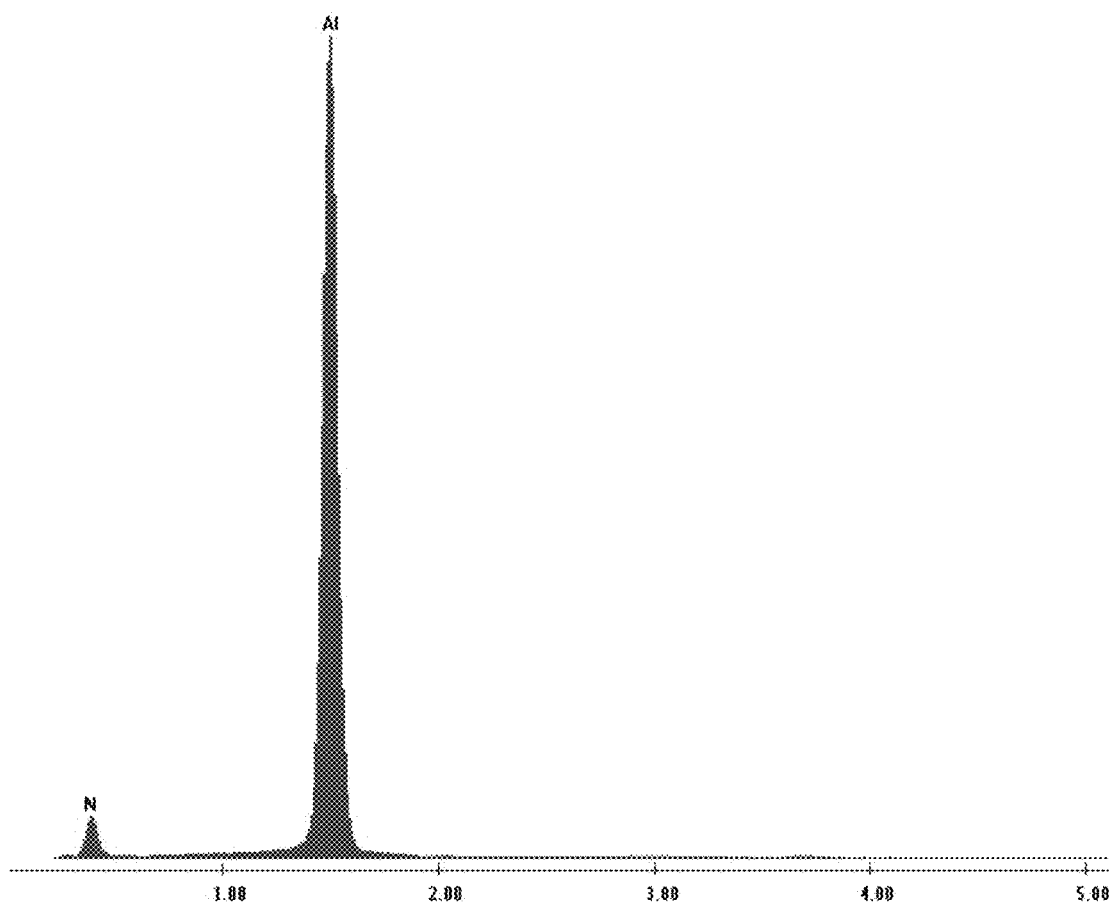
FIG. 6 illustrates EDX of AlN derived from almond nut shell after pyrolyzing in $N_2$ and followed by heat treatment in $O_2$ to remove excessive carbon.

A method of making Aluminum Nitride Synthesis from Nut Shells.

Here, the inventors have discovered a method of forming pure AlN by carbothermal reduction of $Al_2O_3$ with raw nuts of almonds, coconuts, macadamia, pistachios, and walnuts in the presence of a $N_2$ atmosphere to produce nano-tubes and nanoparticles previously not formed by other processing then purified in an $O_2$ atmosphere in a $Al_2O_3$ crucible.

Example 1

The production process involves preparing samples from powders of raw nuts of almonds, coconuts, macadamia, pistachios, and walnuts after mixing them with nanocrystalline $Al_2O_3$ powder using ball milling with a SPEX 8000M including stainless steel milling media.

Example 2

The $Al_2O_3$ sample along with the specific nut shell was combined and milled to obtain a uniform powder. A hydraulic press was used to pressurize the homogenous powder into 1 cm diameter disks with a 2.5-3 mm depth.

The pellets were heat treated (pyrolyzed) in a conventional furnace at temperatures exceeding 1400° C. for an interval of 5-6 hours in a nitrogen atmosphere.

In order to eliminate the residual carbon, the pellets were then placed in air at 670° C.

Example 3

XRD scans were obtained using a Rigaku 18 kW rotating anode generator and a high resolution powder diffractometer. The diffraction scans were collected using monochromatic CuKα radiation.

Raman spectra were collected on an in Via Raman Microscope (Renishaw) using a 514 nm laser line.

Scans were obtained at ca. 15 mW laser power at the sample and an integration period of 30 seconds.

Fourier Transform Infrared (FTIR) spectra were collected using Thermo Scientific Nicolet FT-IR spectrometer with Diffuse Reflectance Infrared Transform Spectroscopy (DRIFTS) accessory.

Example 4

In order to conduct the TEM analysis, ethyl alcohol was mixed with the pyrolyzed sample; the mixture was then set in an ultrasonic cleaner.

A carbon covered 200 mesh copper grid was submerged into the mixture to collect AlN particles.

A FEI Tecnai G2 TEM was utilized to examine the sample at 300 kV.

Nuts have very little $SiO_2$ uptake from the ground but still is a carbon source. Therefore nuts are a great candidate to mix with oxides to form a carbide and/or a nitride with further processing. The result is a pure nitride (in this case AlN) that is made in a simple cost effective process.

AlN made from nuts such as almonds, pistachios, walnuts, cashew, coconuts, macadamia etc. can be made fully dense without the use of other dopants like AlN made in other ways. This provides a more pure bulk form of AlN.

Due to its unique properties, it is extremely useful for the Navy. AlN its applications have been developed mainly for military aeronautics and transport fields.

Other applications of AlN lie in refractory composites for handling of aggressive molten metals, and high efficiency heat exchange systems.

The formation of pure AlN from nut shells offers a simple route as compared to complicated reactions currently being used involving carbon rich agents and at elevated temperatures.

Moving to more environmentally greener processes is important. This process should become the standard processing for obtaining Pure AlN.

The above examples are merely illustrative of several possible embodiments of various aspects of the present disclosure, wherein equivalent alterations and/or modifications will occur to others skilled in the art upon reading and understanding this specification and the annexed drawings. In addition, although a particular feature of the disclosure may have been illustrated and/or described with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

What we claim is:

1. A method of making Aluminum Nitride (AlN) from nut shells comprising:
    preparing powders of agricultural nuts using ball milling including stainless steel milling media;
    preparing powders of nanocrystalline $Al_2O_3$ using ball milling including stainless steel milling media;
    mixing the powders of agricultural nuts and the powders of nanocrystalline $Al_2O_3$ using ball milling including stainless steel milling media and thereby forming a homogenous sample powder of agricultural nuts and $Al_2O_3$;
    pressurizing the homogenous sample powder of agricultural nuts and $Al_2O_3$ into a disk;
    heat treating or pyrolizing the disk in a nitrogen atmosphere; and
    reacting the disk and the nitrogen atmosphere and forming AlN;
    wherein the AlN is nano-structured AlN and in a pure form and in the wurtzite phase of AlN.

2. The method of making Aluminum Nitride (AlN) from nut shells of claim 1 further comprising the step of
    eliminating residual carbon by placing the disk in air after the step of reacting the disk and the nitrogen atmosphere and forming AlN.

3. The method of making Aluminum Nitride (AlN) from nut shells of claim 1
  wherein the disk is a 1 cm diameter disk with a 2.5-3 mm thickness.

4. The method of making Aluminum Nitride (AlN) from nut shells of claim 1
  wherein the step of heat treating or pyrolizing the disk comprises temperatures exceeding 1400° C. for an interval of 5-6 hours in a nitrogen atmosphere.

5. The method of making Aluminum Nitride (AlN) from nut shells of claim 4
  wherein the step of eliminating the residual carbon by placing the disk in air involves a temperature of 670° C.

6. The method of making Aluminum Nitride (AlN) from nut shells of claim 5 further comprising the steps of
  using a 18 kW rotating anode generator and a high resolution powder diffractometer to characterize the structure of the AN using monochromatic CuKα radiation and further using a 514 nm laser line to obtain Raman spectra on an in Via Raman Microscope and scanning at about 15 mW laser power and an integration period of 30 seconds.

7. The method of making Aluminum Nitride (AlN) from nut shells of claim 1 wherein the step of heat treating or pyrolizing the disk comprises a conventional furnace.

8. The method of making Aluminum Nitride (AlN) from nut shells of claim 1 wherein the step of pressurizing utilizes a hydraulic press.

* * * * *